US012566143B2

(12) United States Patent
Eizner et al.

(10) Patent No.: US 12,566,143 B2
(45) Date of Patent: Mar. 3, 2026

(54) OPTICAL INSPECTION SYSTEMS WITH PULSED LIGHT SOURCES AND PULSE MULTIPLEXING

(71) Applicant: Applied Materials Israel Ltd., Rehovot (IL)

(72) Inventors: Elad Eizner, Nes Ziona (IL); Haim Feldman, Nof-Ayalon (IL); Boris Golberg, Ashdod (IL); Ron Naftali, Shoham (IL); Keith Wells, Santa Clara, CA (US)

(73) Assignee: Applied Materials Israel Ltd., Rehovot (IL)

( * ) Notice: Subject to any disclaimer, the term of this patent is extended or adjusted under 35 U.S.C. 154(b) by 17 days.

(21) Appl. No.: 18/409,698

(22) Filed: Jan. 10, 2024

(65) Prior Publication Data

US 2024/0280506 A1 Aug. 22, 2024

Related U.S. Application Data

(60) Provisional application No. 63/447,327, filed on Feb. 21, 2023.

(51) Int. Cl.
*G01N 21/95* (2006.01)

(52) U.S. Cl.
CPC ............. *G01N 21/9501* (2013.01); *G01N 2201/06113* (2013.01); *G01N 2201/103* (2013.01)

(58) Field of Classification Search
CPC ..... G01N 21/9501; G01N 2201/06113; G01N 2201/103; G01N 21/8806; G01N 21/01; G01N 2021/0112; G01N 21/17; G01N 2021/8816; G01N 2021/8845; G03B 15/02
See application file for complete search history.

(56) References Cited

U.S. PATENT DOCUMENTS

| 7,365,836 | B2 | | 4/2008 | Some | |
| 7,728,968 | B2 | * | 6/2010 | Tsai ................... | G02B 17/0856 |
| | | | | | 356/237.5 |
| 9,110,018 | B2 | * | 8/2015 | Handerek ............ | G01N 21/474 |
| 2014/0036957 | A1 | * | 2/2014 | Farhadiroushan ... | G01M 11/086 |
| | | | | | 374/161 |

(Continued)

FOREIGN PATENT DOCUMENTS

| CN | 111272708 | A | * | 6/2020 | ........... | G02B 6/3512 |
| FR | 2554601 | A1 | * | 5/1985 | ........... | G02B 6/2817 |

(Continued)

*Primary Examiner* — Tarifur R Chowdhury
*Assistant Examiner* — Kemaya Nguyen
(74) *Attorney, Agent, or Firm* — Lowenstein Sandler LLP

(57) ABSTRACT

Implementations disclosed describe, among other things, a sample inspection system that includes an illumination subsystem to illuminate a sample with a plurality of time-spaced light pulses generated, using a pulse multiplexing system, from a source light pulse. The pulse multiplexing system includes a plurality of optical loops, each deploying an optical coupler that outputs a first portion of incident light to a sample and provides a second portion of incident light as an input into the next optical loop. The sample inspection system further includes a collection subsystem to collect a portion of light generated upon interaction of the plurality of time-spaced light pulses with the sample, and a light detection subsystem to detect the collected portion of light.

22 Claims, 9 Drawing Sheets

(56)          References Cited

U.S. PATENT DOCUMENTS

2015/0144805 A1 *   5/2015  Yamabe  ................ G01N 21/64
                                                        250/227.24
2022/0120686 A1 *   4/2022  Vaziri  ................ G02B 21/0032

FOREIGN PATENT DOCUMENTS

JP          2010081335  A   *   4/2010
KR          20100051139  A   *   5/2010   ............ G01B 11/24

* cited by examiner

400

Intensity 0.20

0.10

τ=26.6 nsec

Time

410

Intensity 0.03

0.02

0.01

Time 220-1 220-2 220-3 220-4 220-5 220-6 220-7 220-8 220-9

702

704

θ

112

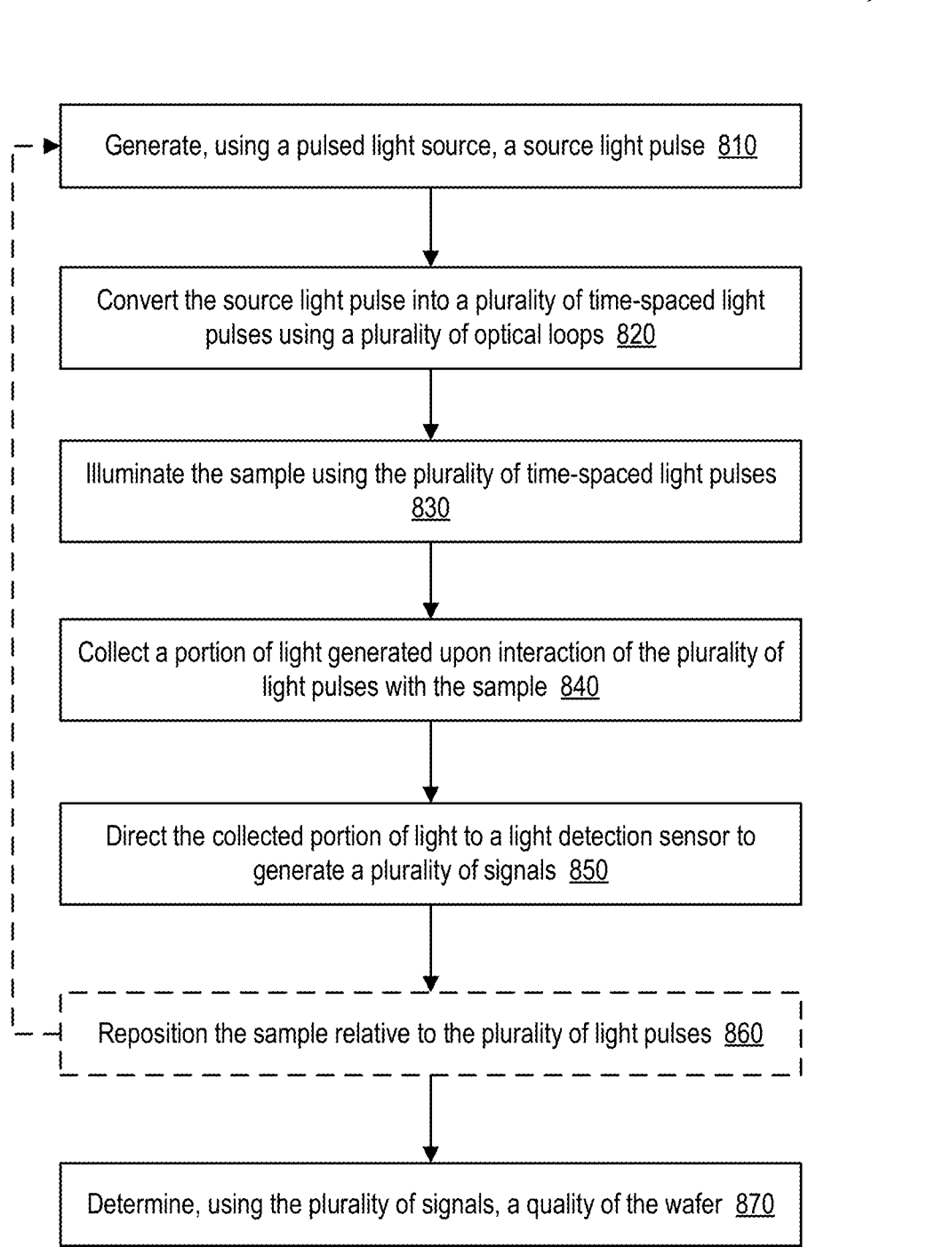

800

Generate, using a pulsed light source, a source light pulse  810

Convert the source light pulse into a plurality of time-spaced light pulses using a plurality of optical loops  820

Illuminate the sample using the plurality of time-spaced light pulses 830

Collect a portion of light generated upon interaction of the plurality of light pulses with the sample  840

Direct the collected portion of light to a light detection sensor to generate a plurality of signals  850

Reposition the sample relative to the plurality of light pulses  860

Determine, using the plurality of signals, a quality of the wafer  870

FIG. 8

OPTICAL INSPECTION SYSTEMS WITH PULSED LIGHT SOURCES AND PULSE MULTIPLEXING

RELATED APPLICATIONS

This application claims the benefit of U.S. Provisional Patent Application No. 63/447,327, filed Feb. 21, 2023, entitled "Optical Inspection Systems With Pulsed Light Sources And Pulse Multiplexing," the contents of which are incorporated by reference in their entirety herein.

TECHNICAL FIELD

This instant specification generally relates to quality control of materials manufactured in substrate processing systems. More specifically, the instant specification relates to optical inspection methods and devices for use in quality control of substrates, wafers, masks, and other products during various stages of manufacturing.

BACKGROUND

Manufacturing of modern materials often involves various deposition techniques e.g., chemical vapor deposition and physical vapor deposition techniques, etching techniques, polishing techniques, photo-masking techniques, and/or various other manufacturing techniques. Materials manufactured in this manner may include monocrystals, semiconductor films, fine coatings, and numerous other substances used in practical applications, such as electronic device manufacturing. Many of these applications rely on the purity of the materials prepared in manufacturing systems. Various detection and sensing systems are used to monitor adherence of processing operations to manufacturing specification, maintain optimal chemical composition and physical conditions of processing environments, and the like. Quality of intermediate and final products is monitored with inspection systems, including optical inspections. Optical inspections can include reflectometry techniques, spectrometry techniques, ellipsometry techniques, etc. Optical inspections can be performed using specularly reflected light, diffusely reflected (scattered) light, transmitted light, or various combinations thereof.

BRIEF DESCRIPTION OF THE DRAWINGS

FIG. 8 is a flow diagram of an example method of performing an optical inspection using a short-pulse light source and pulse multiplexing, in accordance with at least one embodiment.

SUMMARY

Figure 1:
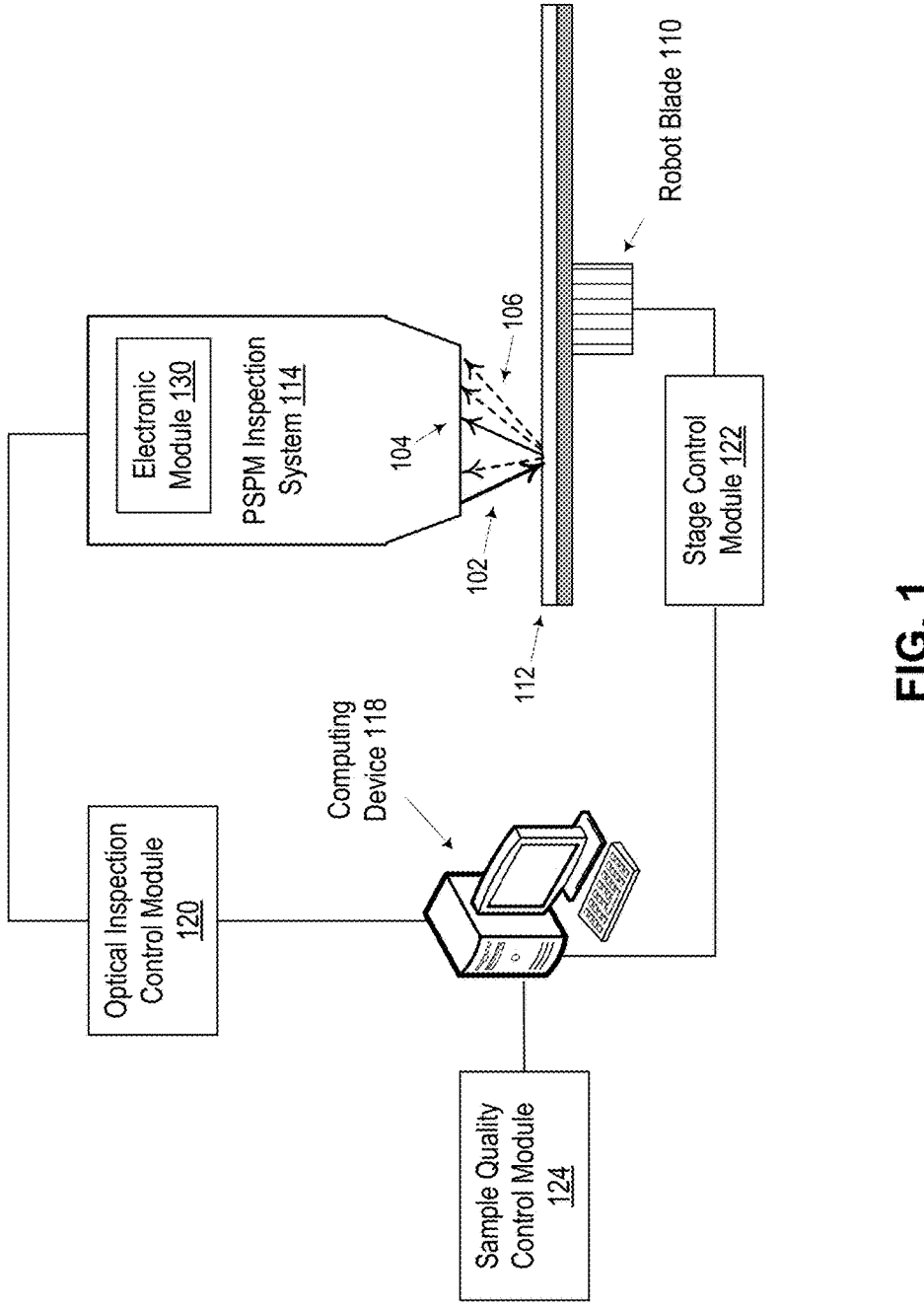
FIG. 1 illustrates an example optical inspection system capable of using short-pulsed light sources and pulse multiplexing for sample quality control during manufacturing operations, in accordance with at least one embodiment.

Some of the embodiments described herein are related to a sample illumination system that includes an illumination subsystem to illuminate a sample, the illumination subsystem having a pulsed light source to generate a plurality of source light pulses and a pulse multiplexing system that converts each of the plurality of source light pulses into a plurality of time-spaced light pulses. The pulse multiplexing system includes a plurality of optical loops, each of the plurality of optical loops deploying an optical coupler that directs a first portion of a light interacting with the optical coupler on an optical path to a sample and provides a second portion of the light interacting with the optical coupler as an input into a next optical loop.

Another embodiment described herein is related to a sample inspection system that includes an illumination subsystem to illuminate a sample, the illumination subsystem having a pulsed light source to generate a plurality of source light pulses and a pulse multiplexing system that converts each of the plurality of source light pulses into a plurality of time-spaced light pulses. The pulse multiplexing system includes a plurality of optical loops, each of the plurality of optical loops deploying an optical coupler that directs a first portion of a light interacting with the optical coupler on an optical path to a sample and provides a second portion of the light interacting with the optical coupler as an input into a next optical loop. The sample inspection system further includes a collection subsystem to collect a portion of light generated upon interaction of the plurality of time-spaced light pulses with the sample. The sample inspection system further includes a light detection subsystem to detect the collected portion of light and generate one or more signals representative of a state of the sample. The sample inspection system further includes a processing device to determine, using the one or more generated signals, the state of the sample.

Another embodiment described is related to a method to perform an inspection of a sample. The method includes generating, using a pulsed light source, a source light pulse and converting the source light pulse into a plurality of time-spaced light pulses using a plurality of optical loops. The method further includes illuminating the sample using the plurality of time-spaced light pulses. The method further includes collecting a portion of light generated upon interaction of the plurality of time-spaced light pulses with the sample. The method further includes directing the collected portion of light to a light detection sensor to generate a plurality of signals. The method further includes determining, using the plurality of signals, one or more characteristics of the sample.

DETAILED DESCRIPTION

Semiconductor device manufacturing often involves tens and even hundreds of complex operations to implement raw wafer (substrate) preparation, polishing, material deposition, etching, and the like. Since even a small number of impurities or other defects introduced into processing environments during such operations can render the manufacturing products (masks, wafers, chips, etc.) unusable for their intended purposes, various manufacturing operations are often interspersed with quality control inspections to verify adherence of intermediate and final products to specifications of the technological processes being performed. Inspections can determine the degree of cleanliness of products (also referred to samples herein), presence of defects in the samples, dimensions of the samples, physical and chemical compositions of the samples, surface morphology of the samples, and/or the like.

Optical (including ultraviolet) inspection systems are capable of efficiently detecting impurities, crystal lattice/morphology defects, surface roughness, non-uniformity of thickness, and/or other product imperfections. Optical inspection systems can deploy bright-field inspection techniques (which use specular reflection of a probe light from samples), dark-field inspection techniques (which use non-specular scattering of a probe light from samples), and/or a combination thereof. A sample (e.g., a mask or wafer with or without a film of materials deposited thereon) can be temporarily removed from a processing line and scanned, location by location, using an optical inspection system that includes an illumination subsystem, a light collection subsystem, various additional optical elements, polarizers, field stops, a light detection subsystem, a data processing subsystem, and the like. To inspect a certain portion of the sample with a desired resolution, an optical inspection system may have to collect a certain number of photons (light energy). For fast and accurate inspection, it can be advantageous to use short-wavelength laser sources with pulses of high intensity (power) to illuminate the sample and collect the target energy of light reflected from the sample. Short pulses (e.g., at or below 10 ns in duration) that carry a sufficient amount of energy, however, can damage samples.

Aspects and embodiments of the present disclosure address these and other challenges of the existing technology by providing for techniques and systems that deploy high-power short-duration light sources in conjunction with optical devices that perform pulse multiplexing. Pulse multiplexers operating in accordance with embodiments of the instant disclosure can generate, based on a high-intensity pulse, N pulses of lower intensities (e.g., by factor ~1/N) and are spread out in time (e.g., at uniform time intervals). The pulses can be focused on the same region of a sample generating reflected photons that are captured by collection optics (referred to as collection subsystem herein) and delivered to light detectors (referred to as a detection subsystem herein). In some embodiments, the pulses can be delivered to different regions of the sample, for simultaneous inspection of wide areas. The pulses can be delivered to the sample over different optical paths. Speckle contrast is reduced by averaging out multiple speckle patterns in illumination caused by individual multiplexed pulses. In some embodiments, the pulses can be engineered to have equal (or approximately equal) intensities, for uniform sample inspection and/or efficient speckle contrast reduction. Numerous other embodiments and variations are discussed herein.

The disclosed embodiments pertain to optical inspections performed in the context of a variety of manufacturing techniques, such as bare wafer manufacturing, chemical mechanical polishing (CMP), physical vapor deposition (PVD), chemical vapor deposition (CVD), plasma-enhanced PVD and/or CVD, atomic layer CVD, combustion CVD, catalytic CVD, evaporation deposition, molecular-beam epitaxy techniques, wafer patterning, photo-mask application, etching, and/or other techniques. The disclosed embodiments can also be advantageously used to improve manufacturing techniques that use vacuum deposition chambers (e.g., ultrahigh vacuum CVD or PVD, low-pressure CVD, etc.) and/or atmospheric pressure deposition chambers.

FIG. 1 illustrates an example optical inspection system 100 capable of using short-pulsed light sources and pulse multiplexing for sample quality control during manufacturing operations, in accordance with at least one embodiment. In some implementations, optical inspection system 100 can be used as part of an inline inspection where a product is being transferred between processing chambers, between a processing chamber and a transfer chamber, between a transfer chamber and a load lock chamber, between a load-lock chamber and a product carrier, and/or the like. In some implementations, optical inspection system 100 can be used as a free-standing inspection system. In some embodiments, optical inspection is performed on a sample 112 (e.g., wafer, a mask, a film, a patterned product, or any combination thereof) carried by movable stage 110 (e.g., a robot blade) that supports and moves sample 112, sometimes also referred to as the target herein. Pulsed source/pulse multiplexing (PSPM) optical inspection system 114 can be used to perform an optical inspection of sample 112, as described in more detail in conjunction with FIGS. 2-8.

PSPM optical inspection system 114 scans sample 112 with one or more beams of light 102 and collects light reflected from sample 112, e.g., specularly reflected light 104 (as part of bright-field inspection) and/or non-specularly scattered light 106. PSPM optical inspection system 114 can be configured to use visible light, UV light, and/or other electromagnetic radiation to inspect sample 112.

An electronics module 130 can control operations of PSPM optical inspection system 114 and can further control at least some processing of optical inspection data collected by PSPM optical inspection system 114. Electronics module 130 can include a microcontroller and a memory device (e.g., buffer) coupled to the microcontroller. The memory device can be used to store instructions that control operations of PSPM optical inspection system 114 and optical inspection data before transmitting the optical inspection data to a computing device 118. Computing device 118 can include optical inspection control module 120 that selects (e.g., in response to instructions stored on computing device 118 or received from a human operator of optical inspection system 100) modes of inspection, resolution of inspection, wavelengths used by PSPM optical inspection system 114, inspection frequency (e.g., pulsed light source repetition rate), wavelength of inspection, zoom of objectives, and the like. Computing device 118 can further include a stage control module 122 that controls speed and timing of rotational and/or translational motion of sample 112 relative to PSPM optical inspection system 114. Computing device 118 can operate a sample quality control module 124 that processes optical inspection data collected by PSPM optical inspection system 114 and determines physical/chemical composition of sample 112, e.g., quality and quantity of impurities, surface imperfections, pattern defects, variations in thickness, and the like. Wafer quality control module 124 can compare the obtained morphological, physical, chemical, etc., properties of sample 112 with specifications of the manufacturing process being performed and determine adherence of sample 112 to those specifications. Wafer quality control module 124 can then determine whether the manufacturing process is to be continued or stopped, whether sample 112 is to be removed from the processing line, returned to the processing line for further processing (e.g., additional polishing, deposition, cleaning, etc.), whether a warning or an alarm signal is to be output to the operator, or can take any number of other programmed actions.

Figures 2A, 2B:
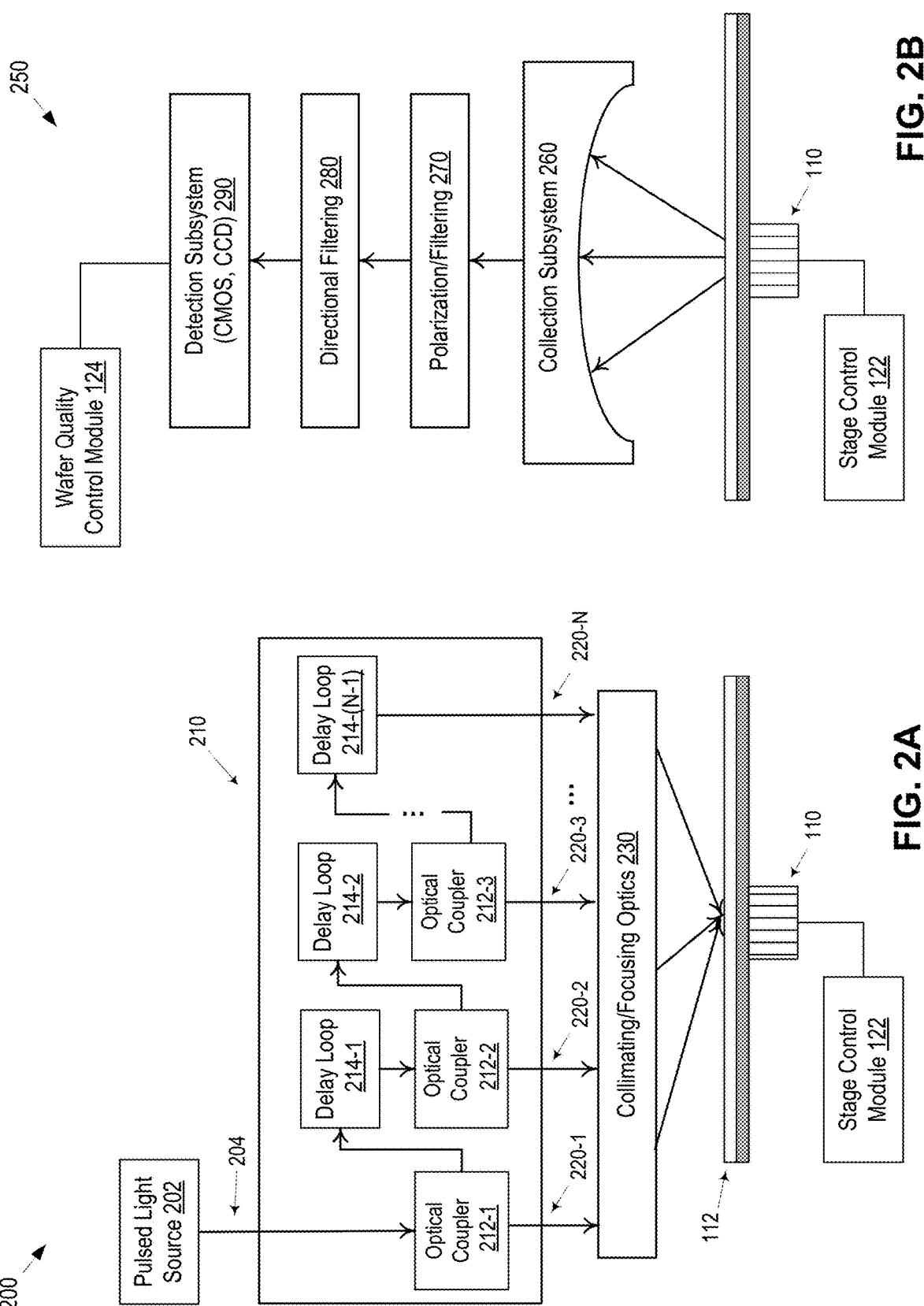
FIG. 2A illustrates an illumination subsystem of an optical inspection system that deploys a short-pulse laser and pulse multiplexing, in accordance with at least one embodiment.
FIG. 2B illustrates a portion of an optical inspection system that processes light that is reflected and/or scattered from a sample, in accordance with at least one embodiment.

FIG. 2A illustrates an illumination subsystem 200 of an optical inspection system that deploys a short-pulse laser and pulse multiplexing, in accordance with at least one embodiment. Illumination subsystem 200 can deploy a pulsed light source 202. Pulsed light source 202 can include a broadband laser, a narrow-band laser, a light-emitting diode, a semiconductor laser, a gas laser, or any other type of a laser. Pulsed light source 202 can include a single-pulse laser, a repetitively pulsed laser, and the like. In some embodiments, a pulsed light source 202 can be (or include) an excimer laser, which can be a gas laser using a combination of one or more noble gasses (such as argon, krypton, xenon, etc.) and one or more reactive halogen gasses (such as chlorine, fluorine, etc.) as the excimer gain medium. An excimer laser can produce light in the 100-400 nm wavelength range or some other suitable range of wavelengths, including but not limited to 126 nm light, 157 nm light, 193 nm light, 222 nm light, 248 nm light, 308 nm light, 351 nm light. The excimer laser can be a pulsed laser capable of operating at a high power, e.g., peak power of 1-10 W at pulses of a 5-20 ns duration and repetition rate of 100 Hz-30 kHz. In some embodiments, pulsed laser's peak power can be within the 200-600 mW range, within the 600 mW-1 W range, within the 1-3 W range, within the 4-5 W range, and so on. In some embodiments, the beam produced by an excimer laser can have a radius of 1-10 mm and can be further conditioned by various collimating and focusing optical elements. In some embodiments, the beam produced by an excimer laser can have a cross-sectional area of 1-10 $mm^2$, or 10-20 $mm^2$, 20-30 $mm^2$, or 30-50 $mm^2$, or 50-100 $mm^2$. In some embodiments, the beam produced by an excimer laser can have a divergence of 0.1-2 mRad, or 0.5-1.5 mRad, or about 1 mRad. In some embodiments, the beam produced by an excimer laser can have a beam propagation ratio ($M^2$) of 15-25, or about 20.

A source light pulse 204 generated by pulsed light source 202 can be delivered to a pulse multiplexing system 210 that outputs multiple light pulses 220-1, 220-2, 220-3, etc. Pulse multiplexing system 210 can use multiple coupled optical delay loops in which a portion of light is output towards a sample 112 and the remaining light is directed to the next loop. More specifically, an optical coupler 212-1 (e.g., a parallel plate beam splitter, a prism beam splitter, and/or the like) can split off a portion (e.g., 1/Nth portion) of source light pulse 204 to generate light pulse 220-1 and direct the remaining light to a delay loop 214-1 that causes the remaining light to incur a time delay t before being delivered to optical coupler 212-2. Optical coupler 212-2 can similarly split off a portion of received light to generate light pulse 220-2, and in turn direct the rest of the light to delay loop 214-2. The time delay caused by delay loop 214-2 can also be t or can have a different value, e.g., if delay loop 214-2 has a different length of the optical path compared with delay loop 214-1. The process can be repeated until the final light pulse 220-N is output by delay loop 214-(N−1).

Illumination subsystem 200 can further deploy collimating/focusing optics 230 that configures optical characteristics and optical paths of light pulses 220-j and delivers light pulses 220-j to sample 112. As depicted schematically in FIG. 2A, light pulses 220-j can be focused on a single region of sample 112. In some embodiments, some or all light pulses 220-j can be focused on different regions of sample 112. As depicted in FIG. 2A, illumination subsystem 200 can direct light pulses 220-j at oblique angles to sample 112. In some embodiments, collimating/focusing optics 230 can direct light pulses 220-j along the normal (perpendicular) direction to sample 112, e.g., illumination subsystem 200 can be used to perform a bright-field optical inspection by collecting specularly reflected light, a dark-field optical inspection by collecting non-specularly reflected (scattered) light, and/or perform some combination thereof. Collimating/focusing optics 230 can include an expander optics that uses light pulses 220-j for an area illumination of sample 112. The expander optics can include a single lens or multiple lenses, and/or other optical elements. In some embodiments, collimating/focusing optics 230 can have one or more reflective optical elements, e.g., curved mirror(s). Collimating/focusing optics 230 can be adjustable to enable control over the size (e.g., diameter) of the illuminated spot on sample 112, e.g., 10-50 mm. In some embodiments, the size of the illuminated spot can be larger than 50 mm or smaller than 10 mm. Collimating/focusing optics 230 can be configured to illuminate a portion of sample 112 that is adjustable in size (e.g., adjustable semi-axes of elliptical regions of sample 112 illuminated by the obliquely-incident light).

Illumination subsystem 200 can include one or more polarizing elements (not shown in FIG. 2A) configured to control polarization of light pulses 220-j incident on sample 112. In some embodiments, the polarizing element(s) can be placed in the optical path of source light pulse 204 before source light pulse 204 is processed by pulse multiplexing system 210, e.g., to cause light pulses 220-j to have the same polarization. In some embodiments, the polarizing element(s) can be included in collimating/focusing optics 230, e.g., to allow individualized control of polarization of light pulses 220-j. The polarizing element(s) can be designed to control the illuminated light polarization at oblique or normal angles of illumination (incidence) with any combination of s, p and/or circular (elliptic) polarizations. In some embodiments, the polarizing elements can impart a uniform polarization to light pulses 220-j across an illumination Numerical Aperture (NA). In some embodiments, the polarizing elements can impart a polarization that is spatially varying across the NA.

Illumination subsystem 200 can be used to inspect sample 112 supported by a movable stage 110, to facilitate inspection of the whole sample 112. Movable stage 110 can be managed by stage control module 122.

FIG. 2B illustrates a portion 250 of an optical inspection system that processes light that is reflected and/or scattered from sample 112, in accordance with at least one embodiment. A collection subsystem 260 can be configured to collect light reflected and/or scattered from sample 112. Collection subsystem 260 can include a single-lens objective or a multi-lens objective capable of collecting light reflected (bright-field light) reflected from sample 112 and/or light scattered (dark-field light) from sample 112. The number and types of lenses of the objective can be selected, e.g., using any known techniques, to reduce light aberration in the objective, including but not limited to chromatic aberration. In some embodiments, the objective can have an outer diameter of 75 mm or less.

A polarization/filtering stage 270 can include one or more polarization element(s) configured to pass light of a specific target polarization, e.g. s-polarization, p-polarization, right-handed circular (or elliptic) polarization, left-handed circular (or elliptic) polarization, and so on. The polarization element(s) can be uniform or spatially varying across the collection NA.

A directional filtering stage 280 can include one or more directional filters configured to pass light collected from a particular interval of angles of reflection (or scattering) from sample 112. Directional filters can be implemented via a light absorbing plate in which suitable apertures are cut out for the passage of light. Some of the apertures can admit the normally reflected light whereas other apertures can admit scattered light. In some embodiments, directional filters can be positioned at the Fourier plane of the objective of the collection subsystem 260. In some embodiments, the directional filters can be positioned at some distance from the Fourier plane, e.g., at distance $D \in [0.8d, 1.2d]$ from the last (e.g., topmost) optical element of the objective, where d is the distance from that last optical element to the Fourier plane (or a conjugate Fourier plane) of the objective.

A detection subsystem 290 can include a relay optics having one or more optical elements (e.g., lenses, mirrors, waveguides, arrays of waveguides, etc.) used to deliver (e.g., focus) the reflected and scattered on an array of light detectors. The light detectors can use complementary metal-oxide-semiconductor (CMOS) image sensors, charge-coupled devices (CCDs), hybrid CMOS-CCD image sensors, photomultiplier tubes (e.g., an array of photocathode-based pixels), photodiodes, phototransistors, or any other suitable photon detectors. Each light detector of detection subsystem 290 can image a separate spot (pixel) of sample 112 illuminated by illumination subsystem 200. The light intensity (e.g., reflectivity) data collected by the light detectors can be provided to sample quality control module 124 that determines sizes, types, concentrations, and/or locations of various defects and imperfections of sample 112. Sample quality control module 124 can be in communication with optical inspection control module 120, which can be capable of changing settings of illumination subsystem 200, collection subsystem 260, polarization/filtering stage 270, directional filtering stage 280, and/or detection subsystem 290. For example, an initial inspection of sample 112 can be performed with a certain set resolution. When a presence of a defect is identified by sample quality control module 124, e.g., based on light reflectivity data collected by detection subsystem 290, sample quality control module 124 can output an instruction to optical inspection control module 120 that can change resolution of imaging by zooming illumination subsystem 200 and/or collection subsystem 260 to a specific region of sample 112 where the defect is located. More specifically, optical inspection control module 120 can change a focal distance of the objective of collection subsystem 260, the distance from the objective to sample 112, and so on. Optical inspection control module 120 can additionally change numerical apertures of directional filters of directional filtering stage 280 to facilitate a change in imaging resolution. Stage control module 122 can determine the distance and direction of repositioning of sample 112 so that previously uninspected spots are exposed to the light pulses. Stage control module 122 can further ensure coordination between the motion of the movable stage 110 and the collection of the inspection data.

In some embodiments, CMOS image sensors, CCD image sensors, and/or any other images sensing elements of detection subsystem 290 can operate in a time delay and integration (TDI) mode. For example, each light pulse 220-*j* can correspond to an individual sensing frame. In the TDI mode, each sensing pixel may aggregate electrical signals (e.g., charge signals, voltage signals, etc.) generated by light pulses 220-*j* during multiple sensing frames. As a result, a number of low-intensity light pulses 220-*j* can be used to achieve a high imaging sensitivity and resolution without exposing sample 112 to high-intensity beams capable of causing damage to the wafer. In those instances, where imaging is performed on a moving sample 112 (e.g., transported by movable stage 110), the signal aggregation in the TDI mode can be performed for pixels that are sequentially exposed to the light reflected or scattered from the same region of the moving sample 112.

In some embodiments, CMOS image sensors used in sensing elements of detection subsystem 290 can be high-speed and low-noise sensors. For example, CMOS image sensors can have speed at or above 1 Gigapixel per second and readout noise at 10 electrons or less, e.g., in the range of 2-10 electrons or even less (e.g., one electron), in some embodiments.

Figure 3:
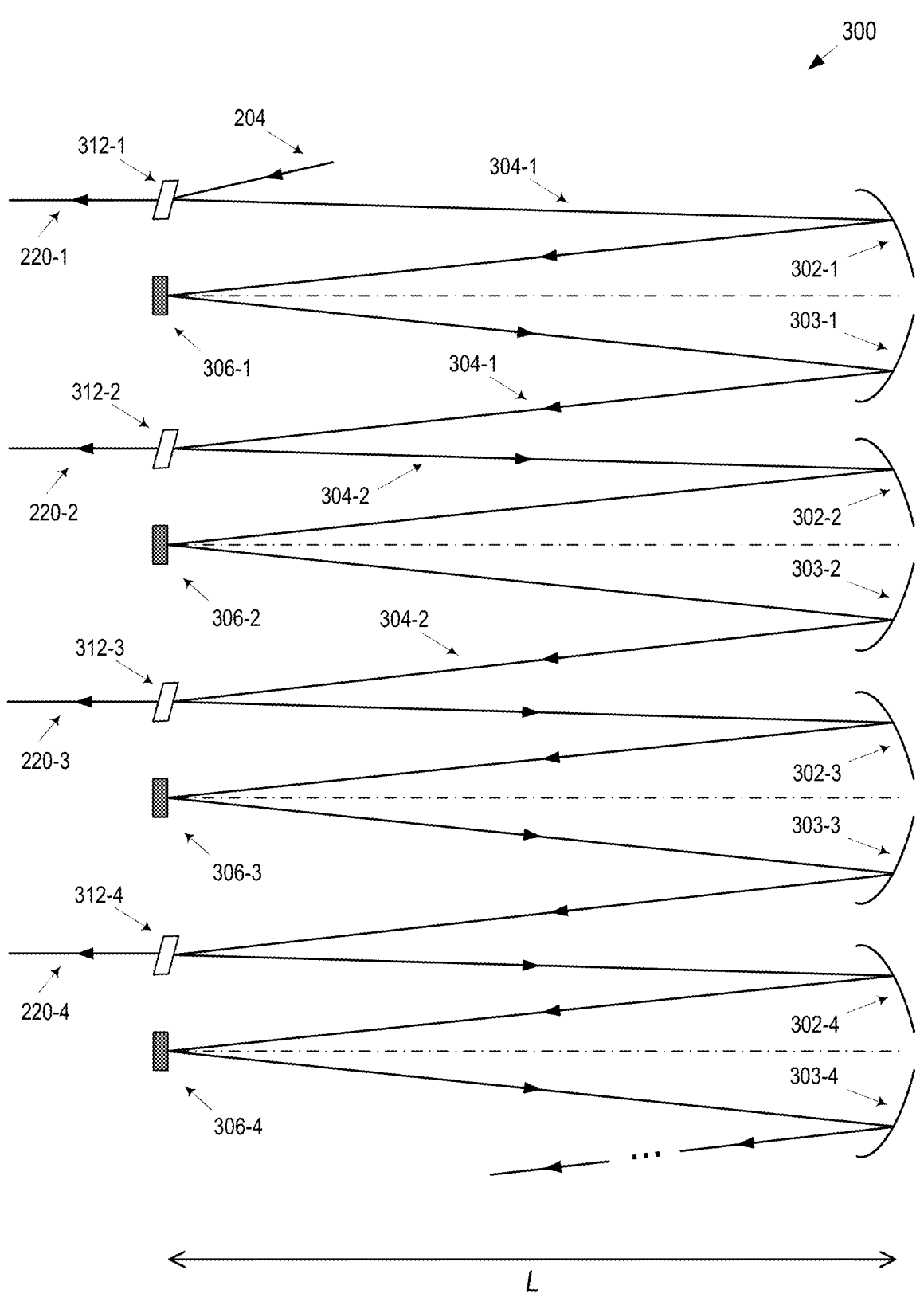
FIG. 3 illustrates an example pulse multiplexing system that generates multiple light pulses based on a source light pulse, in accordance with at least one embodiment.

FIG. 3 illustrates an example pulse multiplexing system 300 that generates multiple light pulses based on a source light pulse, in accordance with at least one embodiment. In some embodiments, pulse multiplexing system 300 can be deployed as pulse multiplexing system 210 of illumination subsystem 200 of FIG. 2A. A source light pulse 204 can be generated by a suitable pulsed light source (e.g., pulsed light source 202 of FIG. 2A). The term "light" should be understood throughout this disclosure as including electromagnetic waves in the visible range of wavelengths, in the UV (ultraviolet) range of wavelengths, in the IR (infrared) range of wavelengths, or in any other suitable range of wavelengths. The term "light" should be understood as referring to any signals of electromagnetic radiation, such as beams, wave packets, pulses, sequences of pulses, or other suitable types of signals. Source light pulse 204 can interact with a beam splitter 312-1 (which can be deployed as optical coupler 212-1) to generate a transmitted light pulse 220-1 and a reflected light pulse 304-1. The light pulse 304-1 can reflect from mirror 302-1, then reflect from mirror 306-1, and reflect again from mirror 303-1. Light pulse 304-1 can then interact with a beam splitter 312-2 (which can be deployed as optical coupler 212-2) to generate a transmitted light pulse 220-2 and a reflected light pulse 304-2. The light pulse 304-2 can reflect from mirror 302-2, reflect from mirror 306-2, and reflect again from mirror 303-2 before generating another light pulse 220-3 at beam splitter 312-3. The process can then be repeated with each additional light pulse 220-*j* generated after passing a respective delay loop, each loop including three reflections from corresponding mirrors 302-*j*, 306-*j*, and 303-*j*. Each loop can operate as the 4F-imaging system to maintain uniform parameters (e.g., lateral pulse spread) of different light pulses 220-*j*. In particular, in the 4F-imaging system, the distance L between mirrors 302-*j*/303-*j* and mirrors 306-*j* and between mirrors 302-*j*/303-*j* and beam splitters 312-*j* can be equal or approximately equal to the focal distance F of mirrors 302-*j*/303-*j*: L≈F. In one example non-limiting embodiment, L=2.0 m, resulting in the free space delay time τ=4 L/c=26.7 ns between pulses (c being the speed of light). In some embodiments, the delay time can be further increased by causing light beams 304-*j* to travel between mirrors in a low-dispersive medium, in which the speed of light propagation is lower than c. In some embodiments, reflectance of mirrors 302-*j*/303-*j* can be about 98.0-99.0%. Although FIG. 3 illustrates pulse multiplexing system 300 in which light pulses 202-*j* are generated upon transmission through optical couplers (beam splitters 312-*j*) and light provided to a subsequent loop is the light reflected from the optical couplers, in other embodiments a different arrangement can be used. For example, the optical couplers can generate light pulses upon reflection while providing transmitted light to a subsequent loop.

In some embodiments, beam-splitters 312-*j* can be made of a transparent dielectric material with low absorption. The amount of light transmitted through and reflected from beam splitters 312-*j* can be controlled via sensitivity of the transmittance/reflectance to interference of the incident and reflected light. For example, a minimum transmittance (maximum reflectance) of a film of thickness d can occur for thicknesses d=(n+½)λ that are equal to a half-integer number of wavelength λ of light in the film. By controlling the difference between thickness d and the nearest number of half-integer wavelengths λ, the transmittance T(d) and reflectance R(d) of beam splitter 312-*j* can be set at desired values between 0 and 1. In those embodiments where the number N of light pulses 220-1 . . . 220-N is large, the transmittance of at least some beam splitters 312-*j* can be smaller (in some instances, much smaller) than its reflectance, T<<R (e.g., when light pulses 220-*j* are output upon transmission), or vice versa, R<<T (e.g., when light pulses 220-*j* are output upon reflections). In some embodiments, the number N of light pulses 220-1 . . . 220-N (and, correspondingly, the number of optical loops) can be 10-20, 20-50, 50-100, 100-200, or even more.

In some embodiments, different mirrors 302-*j* can be implemented as separate physical devices. In some embodiments, at least some of mirrors 302-*j* can be implemented using shared physical devices, e.g., each pair of mirrors 302-*j* and 302-*j* can be implemented as a single mirror, e.g., a spherical mirror, a parabolic mirror, and/or the like. In some embodiments, multiple (or all) pairs of mirrors 302-*j* and 303-*j* can be implemented using a single mirror.

Figure 4A:
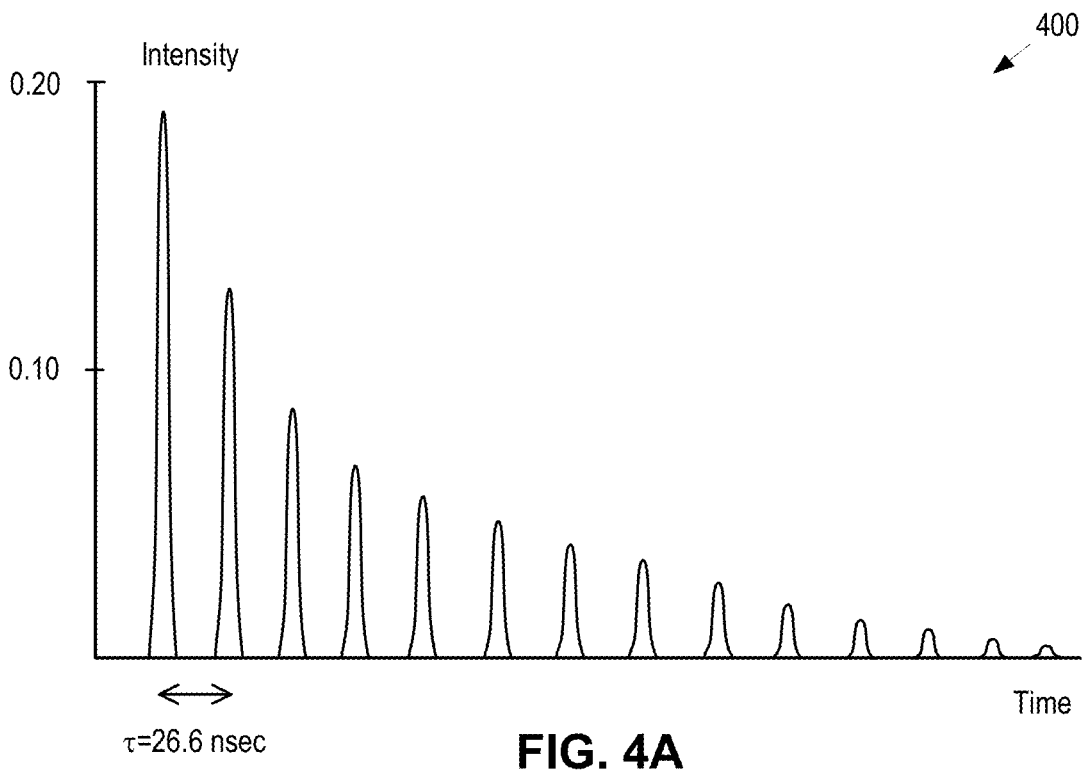
FIG. 4A illustrates intensity of a sequence of light pulses generated by a pulse multiplexing system with a uniform transmittance of different optical couplers, in accordance with at least one embodiment.
Figure 4B:
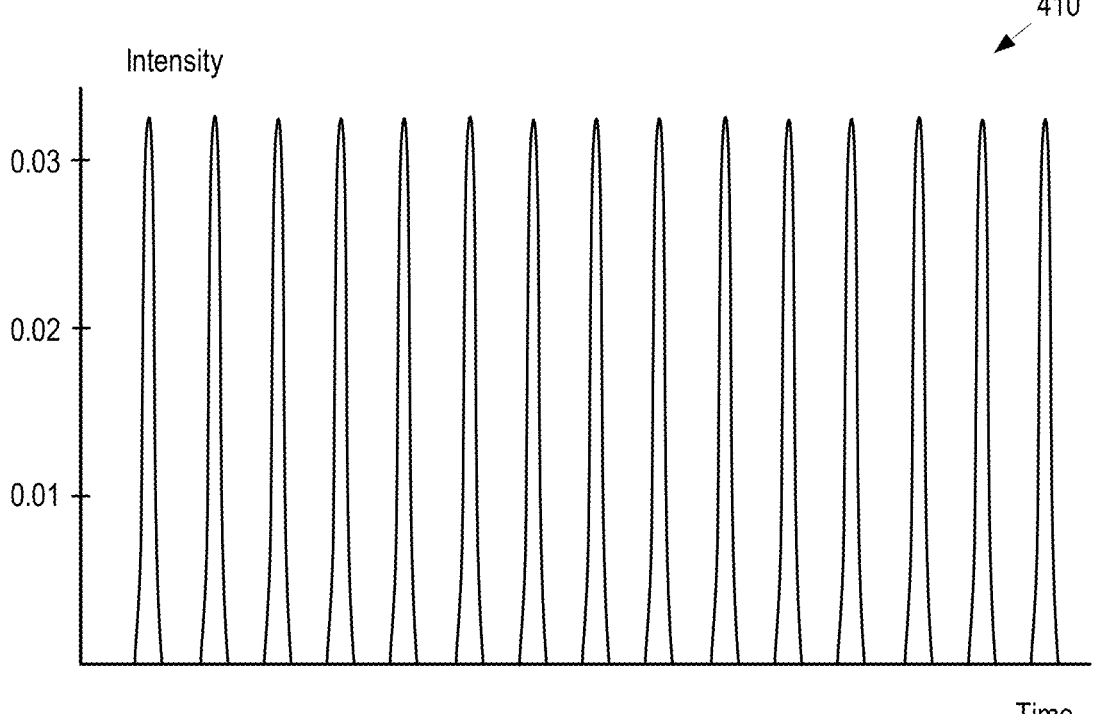
FIG. 4B illustrates intensity of a sequence of light pulses of uniform intensity generated by a pulse multiplexing system with engineered non-uniform transmittance of different optical couplers, in accordance with at least one embodiment.

FIG. 4A illustrates intensity 400 of a sequence of light pulses generated by a pulse multiplexing system with a uniform transmittance of different optical couplers in accordance with at least one embodiment or a cavity pulse multiplexing system with a single optical coupler. More specifically, if beam splitters 312-*j* have the same transmittance T, intensity $I_j$ of light pulse 220-*j* decreases exponentially with the number j. In some embodiments, it can be advantageous to achieve a uniform pulse intensity $I_j$ that is the same (or approximately the same) for different j. This may be achieved by engineering beam splitters 312-*j* to have a j-dependent transmittance $T_j$. FIG. 4B illustrates intensity 410 of a sequence of light pulses of uniform intensity generated by a pulse multiplexing system with engineered non-uniform transmittance of different optical couplers, in accordance with at least one embodiment. More specifically, if the transmittance of beam splitter 312-1 is $T_1$, intensity (e.g., peak intensity) of light pulse 220-1 is $$I_1 = T_1 I_0,$$

where $I_0$ is the intensity of source light pulse 204 output by the pulsed light source. Correspondingly, the intensity of light pulse 304-1 reflected from beam splitter 312-1 is $(1-T_1)I_0$. If losses during pulse 304-1 propagation and reflections (from mirrors 302-1, 303-1, and 306-1) are small, $(1-T_1)I_0$ is also the intensity of light pulse 304-1 incident on beam splitter 312-2. Correspondingly, intensity of light pulse 220-2 is $$I_2 = T_2(1 - T_1)I_0,$$

while intensity of light pulse 304-2 reflected from beam splitter 312-1 is $(1-T_2)(1-T_1)I_0$. Similar equations determine intensities of other pulses 220-*j*, e.g., intensity of the Nth pulse is $$I_N = T_N(1 - T_{N-1}) \ldots (1 - T_1)I_0.$$

Ensuring that all intensities are equal, $I_1=I_2= \ldots I_N$, can be achieved by the individual transmittances $T_1$, $T_2$ . . . satisfying the following recursive equation:

$$T_{j+1} = \frac{T_j}{1 - T_j},$$

whose solution is $$T_{j+1} = \frac{T_1}{1 - jT_1}.$$

In particular, if intensity $I_0$ of source light pulse 204 is to be divided into N equal portions ($T_1=1/N$), the transmittances are $$T_j = \frac{1}{N + 1 - j}, 1 \le j \le N,$$

and increase from $T_1=1/N$ to $T_N=1$ (which corresponds to the absence of a beam splitter in the last loop, as depicted in FIG. 2A). In some embodiments, beam splitters 312-*j* can be engineered with the transmittances $T_j$ further accounting for loss (due to absorption, scattering, or any other type of attenuation) of light during reflections from various mirrors shown in FIG. 3. For example, if a fraction L of light is attenuated in each loop, the intensities of pulses 220-*j* are modified to $I_j=T_j(1-T_{j-1})\ldots(1-T_1)(1-L)^{j-1}I_0$, such that equal intensities imply the following equation, $$T_{j+1} = \frac{T_j x}{1 - T_j}, \quad x = \frac{1}{1 - L}$$

whose solution is $$T_{j+1} = \frac{T_1 x^j}{1 - T_1 \dfrac{x^j - 1}{x - 1}}.$$

Figure 5A:
FIG. 5A illustrates an example pulse multiplexing system that uses a single curved mirror to output multiple light pulses, in accordance with at least one embodiment.
Figure 5A:
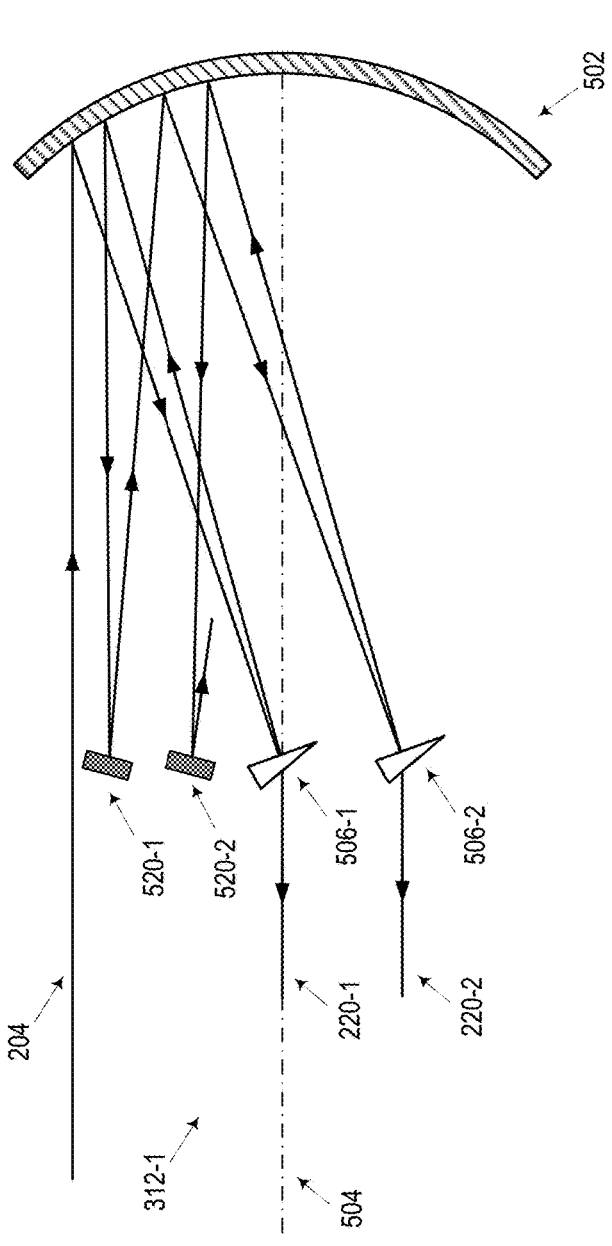

FIG. 5A illustrates an example pulse multiplexing system 500 that uses a single curved mirror to output multiple light pulses, in accordance with at least one embodiment. As illustrated in FIG. 5A, different regions of a curved mirror 502 may be used as reflecting regions for different delay loops. For example, incoming source light pulse 204 (produced by a suitable pulsed light source) can reflect from curved mirror 502, and generate a first light pulse 220-1 upon striking a first optical coupler 506-1, which can be a prism beam splitter, in one embodiment. Light reflected by optical coupler 506-1 can reflect from curved mirror 502, reflect from mirror 520-1 (which can be a flat mirror), and then reflect from curved mirror 502 again before striking a second optical coupler 506-2 and producing a second light pulse 220-2. Light reflected by optical coupler 506-2 can reflect from curved mirror 502 and from mirror 520-2 as part of the next delay loop (not shown in FIG. 5A for conciseness and ease of viewing). Although FIG. 5A depicts an array of optical couplers 506-1, 506-2 and mirrors 520-1 and 520-2 that are located within a single plane, in some embodiments, optical couplers and mirrors (and/or other optical elements) can be placed along both directions of a plane, e.g., a plane that is perpendicular to an optical axis 504 of curved mirror 502 (e.g., the focal plane of curved mirror 502).

Figures 5B, 5C:
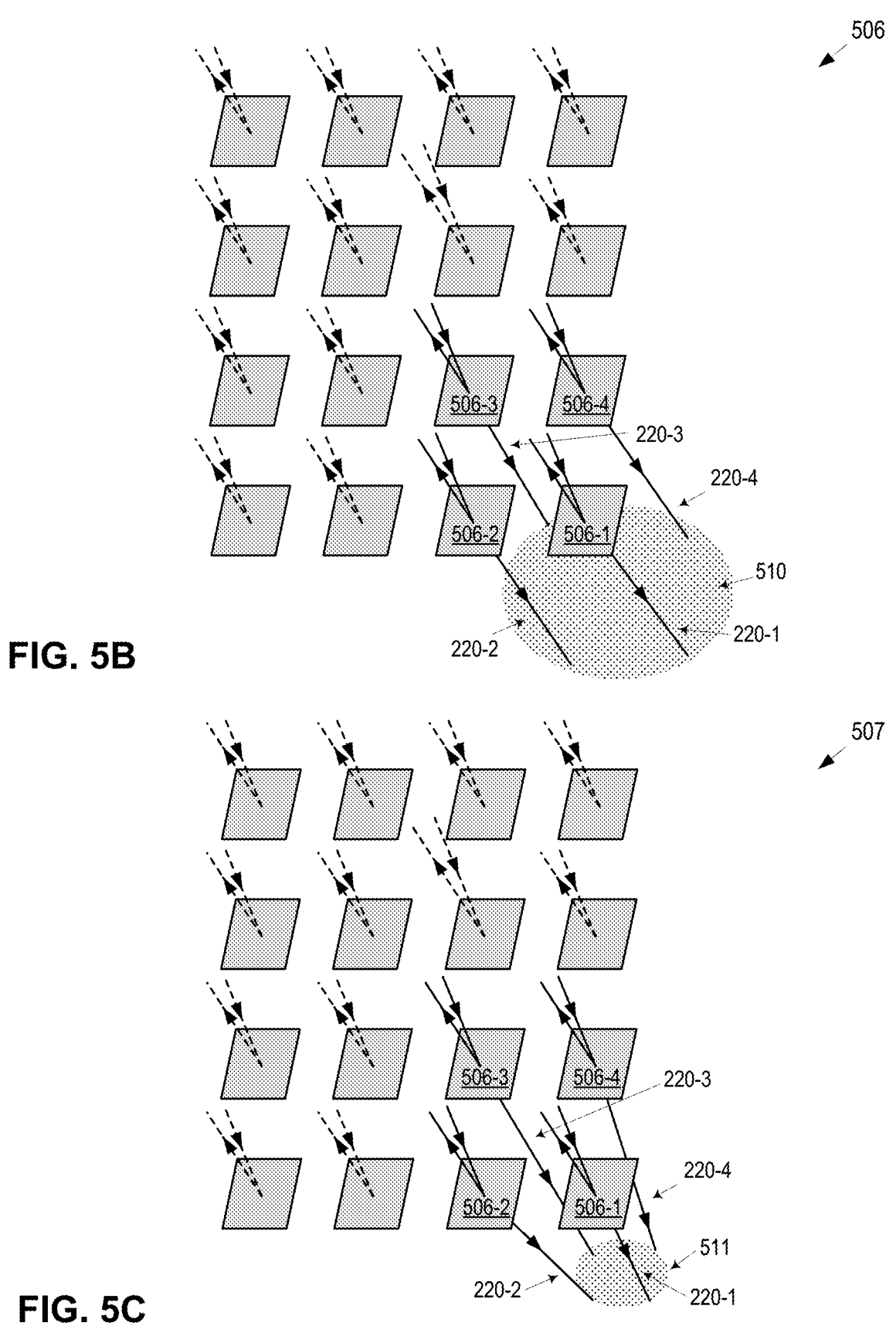
FIG. 5B illustrates an example two-dimensional array of optical couplers that can be deployed in a pulse multiplexing system, in accordance with at least one embodiment.
FIG. 5C illustrates another example two-dimensional array of optical couplers that can be deployed in a pulse multiplexing system, in accordance with at least one embodiment.

FIG. 5B illustrates an example two-dimensional array 506 of optical couplers that can be deployed in a pulse multiplexing system 300 and/or pulse multiplexing system 500, in accordance with at least one embodiment. The two-dimensional array 506 may be illuminated by light reflected from different regions of a single curved mirror (e.g., as described in conjunction with FIG. 5A) or by multiple mirrors. Each optical coupler of array 506 can receive incident light, reflect a portion of the received light back towards the mirror(s) (or some other elements of respective optical delay lines) and transmit a portion towards a target (directly or via any additional collimating and/or focusing optical elements). The optical couplers may direct transmitted light to the same or different areas of the sample. In some embodiments, a first group of the optical couplers can illuminate a first area, a second group of the optical couplers can illuminate a different second area, and so on. For example, a group of optical couplers 506-1, 506-2, 506-3, and 506-4 can transmit corresponding light pulses 220-1, 220-2, 220-3, and 220-4 to illuminate area 510. As illustrated in FIG. 5B, light pulses 220-1, 220-2, 220-3, and 220-4 can be collimated to provide flooded illumination of area 510 (e.g., a wide area). FIG. 5C illustrates another example two-dimensional array 507 of optical couplers that can be deployed in a pulse multiplexing system 500, in accordance with at least one embodiment. In the embodiment of FIG. 5C, light pulses 220-1, 220-2, 220-3, and 220-4 are focused to illuminate a smaller area 511.

Figure 6:
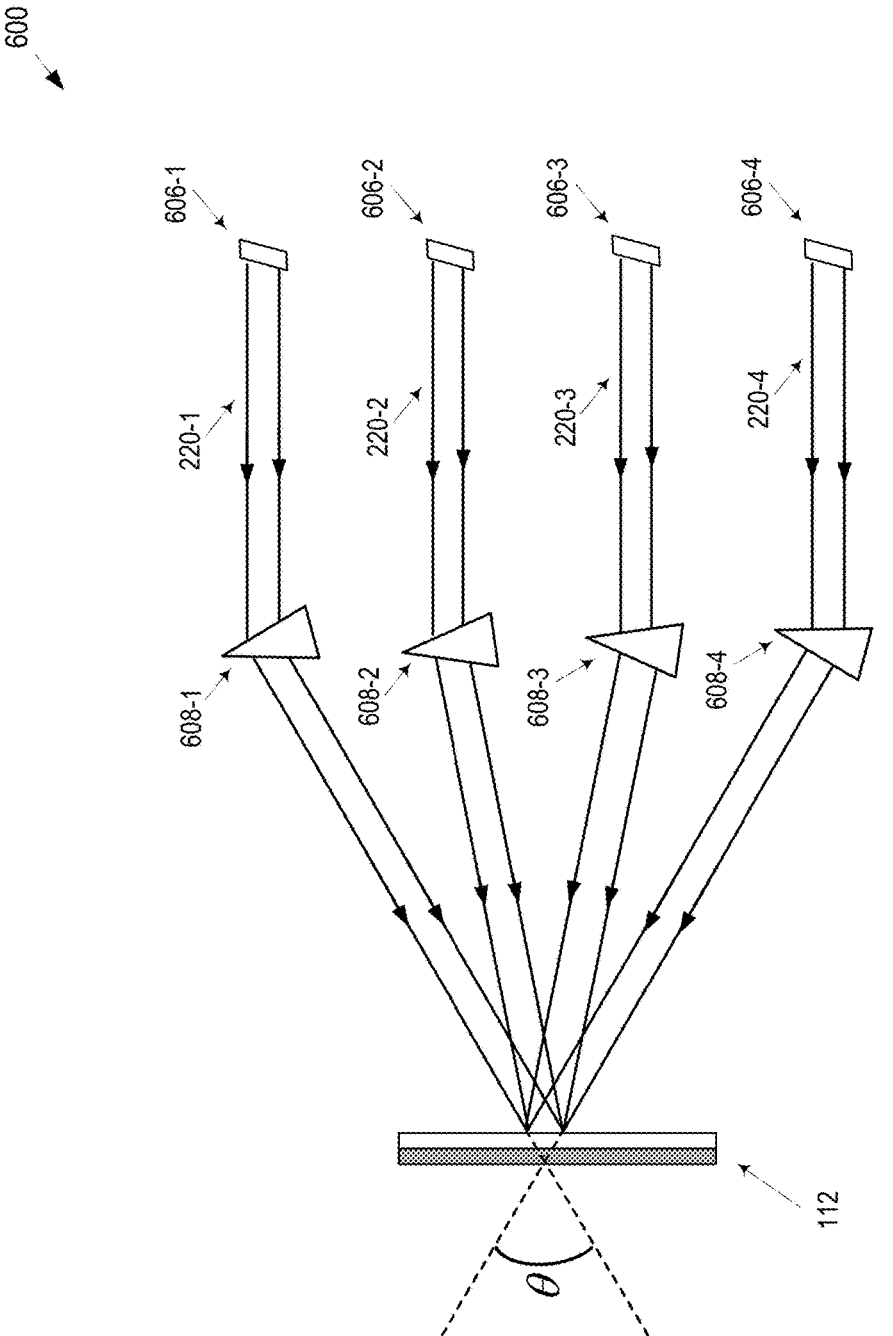
FIG. 6 illustrates an example optical path multiplication system designed to reduce speckles in optical inspection systems that deploy pulse multiplexers, in accordance with at least one embodiment.

FIG. 6 illustrates an example optical path multiplication system 600 designed to reduce speckles in optical inspection systems that deploy pulse multiplexers, in accordance with at least one embodiment. Optical path multiplication system 600 can direct parallel (or almost parallel) beams corresponding to light pulses 220-1 . . . 220-N, which can be outputted by beam splitters 606-1 . . . 660-N, e.g., as described in more detail in conjunction with FIGS. 2-5 (FIG. 6 illustrates an example case of N=4, but the number of light pulses 220-j need not be limited). Optical path multiplication system 600 can include a plurality of prisms 608-1 . . . 608-N or any other optical elements (e.g., diffraction gratings, mirrors) capable of changing directions of light pulses 220-j. Optical wedges 608-j can direct transmitted (or reflected) light towards sample 112. Optical path multiplication system 600 has a numerical aperture (NA) (the angle θ of a cone incident on sample 112) that is controlled by placement and optical characteristics of prisms 608-j. Although, for conciseness and ease of viewing, sample 112 is shown positioned near an intersection of optical paths extending from optical wedges 608-j, in some embodiments, one or more additional optical elements (e.g., lenses, mirrors, and/or the like) may be so positioned that collect light pulses from optical wedges 608-j and deliver the light pulses to an actual location of sample 112.

Optical path multiplication systems with large NAs (e.g., θ≥45°) enable efficient speckle reduction. Speckles arise in the course of illumination of a sample with a coherent light (e.g., light generated by a continuous mode-locked laser) from interference of closely spaced optical paths. As a result of alternating constructive and destructive interference, significantly different reflected intensities can be detected from closely positioned spots of the sample. This can result in a non-uniform optical inspection. Large NAs achieved by optical path multiplication system 600 (or similar optical path multiplication systems) ensure that optical paths taken by different light pulses 220-j have different lengths. Therefore, speckle patterns in reflection of individual light pulses 220-j from sample 112 are uncorrelated. The Gaussian averaging of uncorrelated speckle patterns causes the speckle contrast (e.g., standard deviation of the number of photons collected from different areas) to decrease by approximately $1/\sqrt{N}$.

Further reduction of speckle contrast is achieved by pulse multiplexing in the time domain. A pulsed light source (e.g., an excimer laser) can have low coherence such that the coherence time of the light source is less than (or does not significantly exceed) the time between consecutive pulses, e.g., 10-3 sec for 1 kHz repetition rate. Correspondingly, light pulses 220-j obtained by pulse multiplexing can have uncorrelated (e.g., random) relative phases.

Figure 7:
FIG. 7 illustrates another example optical path multiplication system designed to reduce speckles in optical inspection systems that use pulse multiplexers, in accordance with at least one embodiment.

FIG. 7 illustrates another example optical path multiplication system 700 designed to reduce speckles in optical inspection systems that use pulse multiplexers, in accordance with at least one embodiment. Optical path multiplication system 700 can deploy a lens array 702 (e.g., an array of microlenses), with individual lenses receiving respective light pulses 220-1 . . . 220-N (an example case of N=9 is shown though the number of light pulses 220-j and lenses need not be limited). A condenser lens 704 can direct light received from each lens of lens array 702 and direct the received light towards sample 112. Desired NAs (e.g., large NAs) of optical path multiplication system 700 can be engineered by controlling focal lengths of lenses in lens array 702, focal length of condenser lens 704, distance between sample 112 and condenser lens 704, distance between condenser lens 704 and lens array 702, and/or the like. Although, for conciseness and ease of viewing, sample 112 is shown positioned near an intersection of optical paths extending from lens array 702 and condenser lens 704, in some embodiments, one or more additional optical elements (e.g., lenses, mirrors, and/or the like) may be so positioned that collect light pulses from condenser lens 704 and deliver the light pulses to an actual location of sample 112. In some embodiments, lens array 702 can be replaced with an array of diffractive optical elements, an array of mirrors (e.g., micromirrors), and/or any other suitable optical elements that increases NA associated with light pulses 220-*j*.

Optical path multiplication systems may include additional optical elements not explicitly depicted in FIG. 6 and FIG. 7. For example, optical path multiplication system 600 and/or optical path multiplication system 700 may include one or more optical diffusers that scatter incident light along a wide range of directions. For example, one or more optical diffusers can be positioned between (with reference to FIG. 6) optical wedges 608-*j* and sample 112, between optical couplers 606-*j* and optical wedges, or prior to optical couplers 606-*j*. Similarly, one or more optical diffusers can be positioned between (with reference to FIG. 7) condenser lens 704 and sample 112, between condenser lens 704 and lens array 702 (mirror array, etc.), or prior to lens array 702.

Multiple variations of the example embodiments disclosed above are within the scope of the instant disclosure. In some embodiments, the optical inspection system operating in accordance with the disclosed techniques can have multiple (e.g., two or more) inspection heads, each of the inspection heads including an illumination subsystem 200, a collection subsystem 260, a detection subsystem 290, and/or other disclosed components and devices. Each inspection head can include an illumination subsystem configured to generate light that is normally and/or obliquely incident on sample 112. In various embodiments, normal illumination and/or oblique illumination can be used for either bright-field inspection of sample 112 or dark-field inspection of sample 112 or both.

In some embodiments, the illumination subsystem (e.g., of each inspection head) can be configurable into one of a plurality of spectral configurations, each spectral configuration characterized by different spectral characteristics of the incident light, e.g., a different wavelength or a different set of multiple wavelengths of the normally-incident beam of light and/or the obliquely-incident beam of light. In some embodiments, two or more different pulsed light sources 202 may be deployed (e.g., two or more excimer lasers) each individual pulsed light source generating pulses of different wavelengths (or different sets of multiple wavelengths).

In some embodiments, the illumination subsystem can be configurable into one of a plurality of intensity configurations, each of the intensity configurations characterized by a different intensity of the light pulses generated by the pulse multiplexing system. In some embodiments, the illumination subsystem can be configurable into one of a plurality of polarization configurations characterized by a different polarization state of the light pulses. In some embodiments, the illumination subsystem can be configurable into one of a plurality of beam spot configurations characterized by a different size of a region of the sample illuminated with the light pulses.

In some embodiments, the collection subsystem can be independently configurable into one of a plurality of field-of-view configurations, each of the field-of-view configurations characterized by a different numerical aperture for collection of the generated light. In some embodiments, the collection subsystem can be independently configurable into one of a plurality of polarization configurations characterized by a different polarization state of the collected light.

In some embodiments, the detection subsystem can be independently configurable into one of a plurality of detection configurations, each of the detection configurations characterized by at least one of a different gain, a different data rate, or a different dynamic range.

In some embodiments, the optical inspection system can have a phase contrast function. For example, a normally-incident light pulses can pass through one or more polarizers that cause the pulses to be split (e.g., using Wollaston prisms) into sets of pulses with different polarizations (e.g., s-polarized pulses and p-polarized pulses). The reflected polarized light can then pass through the polarizers to obtain combined pulses having an interference pattern that is detected by detection subsystem 290. In some embodiments, the optical inspection system can have a differential interference contrast (DIC) function where the normally-incident pulses are split into two pulses of different polarizations that follow close but different optical paths and probe two closely spaced locales of sample 112.

In some embodiments, incident pulses (e.g., normally-incident light) can be in a certain polarization state, e.g., an s-polarized state or a p-polarized state, in a right-handed circularly (or elliptically) polarized state or in a left-handed circularly (or elliptically) polarized state, or in any combination thereof. In some embodiments, the collection subsystem 260 can separately collect reflected light with different polarizations. For example, the reflected light can pass through a polarizing optical element so that the components of the reflected light with different polarization can be directed to different optical paths and can be detected independently. In some embodiments, polarization/filtering stage 270 can let one of the polarization states (e.g., s-polarized light, right-handed polarized light, etc.) of the reflected light pass through and reject the other polarization state (e.g., p-polarized light, left-handed polarized light, etc.) of the reflected light, or vice versa. In some embodiments, polarization/filtering stage 270 can let through one of the polarization states of the reflected light reflected off a first region of sample 112 and let through the other polarization state of the reflected light reflected off a second region of sample 112.

In some embodiments, each (or some) regions of sample 112 can be imaged using two or more angles of incidence of the normally-incident and/or obliquely incident beams. The directions of the incident pulses can be controlled, in some embodiments, by tilting illumination subsystem 200 (or some elements of illumination subsystem 200). Two or more images obtained by detection subsystem 290 for different tilt angles can be aggregated (e.g., averaged) to further reduce speckle artifacts, e.g., in addition to or independently of the techniques of speckle reduction described above.

In some embodiments, multiple images of a specific region of sample 112 can be fused to obtain a combined image of the region. The combined image can include multiple images obtained using different pulses, different angles of incidence of normally-incident light, different angles of incidence of obliquely-incident light, one or more resolutions, one or more intensities of light pulses, and/or the like. In some embodiments, different images of the same region can be used to eliminate or reduce noise in the combined image of that region. Different images of the same region may provide complementary information about defects and imperfections located in that region.

In some embodiments, various defects can be classified among a plurality of classes (bins), e.g., a particle defect, a narrow contaminated area, a wide contaminated area, a hump, a groove, a wafer crack, a wafer deformation, a flaking of a film deposited on the wafer, and the like. Classification of defects among the classes can be based on the multiple images obtained by various modes (channels) deployed by the optical inspection system, with different inspection modes detecting different optical features of the respective defects/imperfections.

In some embodiments, collection subsystem 260 can deploy a catadioptric objective. The catadioptric objective can include various optical elements, such as semi-transparent mirrors, focusing mirrors, one or more lenses, and/or other elements. A catadioptric objective that uses a focusing (e.g., spherical, ellipsoid, parabolic, etc.) mirror can have an advantage of enabling a wide field-of-view of sample 112, where scattered dark-field light is collected from a large interval of angles (large numerical aperture). Catadioptric objectives can provide additional benefits of supporting different spectral distributions (e.g., different wavelengths) of imaging pulses of light without introducing detrimental dispersion to the optical paths of reflected and scattered light.

In some embodiments, the optical inspection system can operate using multiple inspection selectable modes, e.g., in the bright-field mode and in the dark-field mode. In some embodiments, the optical inspection system can selectively operate in an aligned polarization state, e.g., with the incident light having a first polarization and the admitted reflected/scattered light also having the first polarization. In some embodiments, the optical inspection system can selectively operate in a cross-polarization state, e.g., with the incident light having a first polarization and the admitted reflected/scattered light having the second polarization. The first polarization and/or the second polarization can be uniform or spatially varying across the NA. In some embodiments, the optical inspection system can operate with selectable wavelengths of pulsed light source 202. In some embodiments, repetition frequency of pulsed light source 202 can be adjusted dynamically, e.g., in the range between 1-100 kHz.

In some embodiments, the movable stage 110 can impart a combination of a rotational motion and a translational motion to cause the light pulses to scan sample 112 in a spiral fashion, e.g., starting from the center of sample 112 and continuing towards the outer edge of sample 112 (or in the opposite direction). In some embodiments, multiple inspection heads can scan the full area of sample 112 in concert, e.g., with a first inspection head scanning a first portion of sample 112, a second inspection head scanning a second portion of sample 112, and so on. In some embodiments, one inspection head can scan sample 112 using the bright-field inspection mode and another inspection head can scan sample 112 in the dark-field inspection mode.

FIG. 8 is a flow diagram of an example method 800 of performing an optical inspection using a short-pulse light source and pulse multiplexing, in accordance with at least one embodiment. Method 800 can be performed using systems and components illustrated in FIGS. 2-7 or some combination thereof. Some or all blocks of method 800 can be performed responsive to instructions from computing device 118 and/or electronics module 130. Computing device 118 and/or electronics module 130 can include one or more processing devices, such as central processing units (CPUs), application-specific integrated circuits (ASICs), field programmable gate arrays (FPGAs), digital signal processors (DSPs), network processors, or the like. The processing device(s) can be communicatively coupled to one or more memory devices, such as read-only memory (ROM), flash memory, static memory, dynamic random access memory (DRAM), and the like. In some embodiments, computing device 118 and/or electronics module 130 can be connected to a larger network of computing devices. In some embodiments, method 800 can be performed while the sample is still positioned inside a processing chamber. In some embodiments, method 800 can be implemented once the sample has been removed from the processing chamber. The inspection process can occur at low temperatures, or at temperatures that are less or significantly less than the room temperature. Alternatively, the inspection process can occur at room temperature, above room temperature, or significantly above room temperature. In some embodiments, during the inspection process, the sample can experience pressure that is less than the atmospheric pressure, including low vacuum or high vacuum conditions.

At block 810, method 800 can include generating, using a pulsed light source, a source light pulse. In some embodiment, the pulsed light source can include an excimer laser (e.g., a laser with an excimer gain medium) with a repetition rate of source light pulses between 500 Hz and 10 kHz. In some embodiments, different source light pulses of the plurality of source light pulses have mutually uncorrelated phases. At block 820, method 800 can continue with converting the source light pulse into a plurality of time-spaced light pulses using a plurality of optical loops. Each of the plurality of optical loops can include an optical coupler (e.g., beam splitter 312-1, beam splitter 312-2, beam splitter 312-3, and so on, as in FIG. 3) that directs a first portion (e.g., light pulse 220-2) of a light incident (e.g., light pulse 304-1) on the optical coupler on an optical path to the sample. The optical coupler can provide a second portion (e.g., light pulse 304-2) of the light interacting with (e.g., incident on) the optical coupler as an input into a next optical loop of the plurality of optical loops.

At block 830, method 800 can continue with illuminating the sample using the plurality of time-spaced light pulses. In some embodiments, the illumination subsystem used to illuminate the sample can be configurable into a plurality of configurations. In some embodiments, each of the plurality of configurations has a different size of a region of the sample illuminated with the plurality of time-spaced light pulses. In some embodiments, each of the plurality of configurations has a different intensity of the plurality of time-spaced light pulses. In some embodiments, each of the plurality of configurations has a different polarization state of the plurality of time-spaced light pulses. A "polarization state" should be understood as including an s-polarized state of light, a p-polarized state of light, a right-handed circularly (or elliptically) polarized state of light, left-handed circularly (or elliptically) polarized state of light, or any combination (superposition) thereof. "Polarization state" should also include unpolarized light or partially-polarized light. In some embodiments, each of the plurality of configurations has different characteristics (e.g., different wavelengths or different sets of multiple wavelengths) of the plurality of time-spaced light pulses.

In some embodiments, the illumination subsystem can be configurable into a first configuration, in which the illumination subsystem is to illuminate the sample with the plurality of time-spaced light pulses that are normally incident on the sample at a first set of angles of incidence not exceeding 10 degrees. In some embodiments, the illumination subsystem can be configured in a second configuration, in which the illumination subsystem is to illuminate the sample with the plurality of time-spaced light pulses that are incident on the sample at a second set of angles of incidence exceeding 45 degrees.

At block 840, method 800 can continue with collecting a portion of light generated upon interaction of the plurality of time-spaced light pulses with the sample. The generated portion of light can be collected by a collection subsystem. The generated light should be understood as including specularly reflected light and/or diffusely reflected (scattered) light. The collection subsystem can include an objective having one or more lenses and/or one or more curved mirrors, one or more polarizing elements, one or more directional filters, beam splitters, elements of relay optics, and/or the like. Some of the components of the collection subsystem(s) can be shared with the illumination subsystem(s), e.g., objective, beam splitters, polarizers, and so on. The collection subsystem can be configured into one of a plurality of configurations. In some embodiments, in each of the plurality of configurations, the collection subsystem can be characterized by a different size of a region of the sample from which the portion of light is collected.

In some embodiments, each collection subsystem can be independently configurable into one of a plurality of directional configurations. In each of the plurality of directional configurations, the portion of the generated light can be collected from a different set of spatial directions. For example, changing the collected portion can be performed by moving a side aperture of a directional filter to a different position relative to the optical axis of the collection subsystem (or replacing the directional filter with another filter with differently-positioned side aperture).

In some embodiments, each collection subsystem can be independently configurable into one of a plurality of polarization configurations. In each of the plurality of polarization configurations, the collected portion of the generated light can have a different polarization. For example, polarization of the collected portion can be controlled by elements of polarization/filtering stage 270.

At block 850, method 800 can continue with directing the collected portion of light to a light detection sensor to generate a plurality of signals. The plurality of signals (e.g., electrical signals) can be representative of a state (e.g., quality) of the sample. In some embodiments, the light detection sensor can include a CMOS image sensors. In some embodiments, an array of light detectors can include a CCD camera. In some embodiments, an array of light detectors can include an array of photomultiplier tubes.

At block 860, method 800 can include repositioning, using a movable stage, the sample relative to the plurality of time-spaced light pulses. In some embodiments, repositioning the sample can include imparting to the sample a combination of a translational motion and a rotational motion. As indicated with the dashed arrow in FIG. 8, after repositioning of the wafer, the operations of blocks 810-850 can be repeated for the new regions of the sample being exposed to the light pulses.

At block 870, method 800 can include determining, using the plurality of generated signals, one or more characteristics of the sample. For example, a processing device can process the plurality of generated signals and determine locations, types, amounts, etc., of various defects and imperfections that are present on the surface of the sample or in the bulk of the sample. The processing device can then determine whether the detected defects and imperfections place the sample outside a specification of the technological process being performed or if the sample comports to the specification.

It should be understood that the above description is intended to be illustrative, and not restrictive. Many other implementation examples will be apparent to those of skill in the art upon reading and understanding the above description. Although the present disclosure describes specific examples, the systems and methods of the present disclosure are not limited to the examples described herein and may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The embodiments of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment, embodiment, and/or other exemplarily language does not necessarily refer to the same embodiment or the same example, but may refer to different and distinct embodiments, as well as potentially the same embodiment.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A sample illumination system comprising:
a pulsed light source to generate a plurality of source light pulses; and
a pulse multiplexing system to convert each of the plurality of source light pulses into a plurality of time-spaced light pulses, the pulse multiplexing system comprising:
a plurality of optical couplers, and
a plurality of optical loops, wherein each optical loop of the plurality of optical loops uses a respective optical coupler of the plurality of optical couplers to direct a first portion of light interacting with the respective optical coupler on an optical path to a sample and provide a second portion of the light interacting with the optical coupler as an input into a next optical loop of the plurality of optical loops.

2. The sample illumination system of claim 1, wherein the pulsed light source comprises an excimer laser with a repetition rate of the plurality of source light pulses between 500 Hz and 10 kHz.

3. The sample illumination system of claim 1, wherein different source light pulses of the plurality of source light pulses have uncorrelated phases.

4. The sample illumination system of claim 1, wherein the optical couplers of the plurality of optical loops are arranged in a two-dimensional array.

5. The sample illumination system of claim 4, wherein two or more of the optical couplers in the two-dimensional array are illuminated by a curved mirror, wherein each of the two or more optical couplers receive incident light reflected from a different region of the curved mirror.

6. The sample illumination system of claim 1, further comprising:
an optical path multiplication system configured to reduce speckles of the plurality of time-spaced light pulses.

7. The sample illumination system of claim 6, wherein the optical path multiplication system comprises a plurality of receiving optical elements, each of the plurality of receiving optical elements receiving a respective time-spaced light pulse of the plurality of time-spaced light pulses, wherein the plurality of receiving optical elements comprises at least one of:
an array of lenses,
an array of mirrors,
an array of diffractive optical elements; or
one or more diffuser elements.

8. The sample illumination system of claim 1, wherein plurality of time-spaced light pulses have a uniform intensity.

9. The sample illumination system of claim 8, wherein the uniform intensity is achieved by at least some optical couplers having different optical characteristics, wherein the optical characteristics comprise at least one of an optical transmittance or an optical reflectance.

10. The sample illumination system of claim 1, wherein the pulsed light source is configurable into a plurality of configurations, wherein in each of the plurality of configurations the pulsed light source generates source light pulses of a different wavelength.

11. A sample inspection system comprising:
an illumination subsystem to illuminate a sample, the illumination subsystem comprising:
a pulsed light source to generate a plurality of source light pulses; and
a pulse multiplexing system to convert each of the plurality of source light pulses into a plurality of time-spaced light pulses, the pulse multiplexing system comprising:
a plurality of optical loops, wherein each optical loop of the plurality of optical loops uses a respective optical coupler of a plurality of optical couplers to direct a first portion of light interacting with the respective optical coupler on an optical path to a sample and provide a second portion of the light interacting with the optical coupler as an input into a next optical loop of the plurality of optical loops;
a collection subsystem to collect a portion of light generated upon interaction of the plurality of time-spaced light pulses with the sample; and
a light detection subsystem to detect the collected portion of light and generate one or more signals representative of a state of the sample; and
a processing device to determine, using the one or more generated signals, the state of the sample.

12. The sample inspection system of claim 11, wherein pulsed light source comprises an excimer laser with a repetition rate of source light pulses between 500 Hz and 10 kHz.

13. The sample inspection system of claim 11, wherein the optical couplers of the plurality of optical loops are arranged in a two-dimensional array.

14. The sample inspection system of claim 11, wherein the illumination subsystem further comprises:
a diffuser to increase a numerical aperture of the plurality of time-spaced light pulses.

15. The sample inspection system of claim 11, wherein the plurality of time-spaced light pulses have a uniform intensity.

16. The sample inspection system of claim 11, wherein the light detection subsystem comprises a Complementary Metal-Oxide-Semiconductor (CMOS) sensor operating at a speed at or above 1 Gigapixel per second with a readout noise at or below 10 electrons.

17. The sample inspection system of claim 11, wherein the collection subsystem comprises a catadioptric objective.

18. The sample inspection system of claim 11, wherein the pulsed light source comprises a laser with an excimer gain medium.

19. The sample inspection system of claim 11, wherein the illumination subsystem is configurable into a plurality of configurations, wherein each of the plurality of configurations is characterized by at least one of:
a different size of a region of the sample illuminated with the plurality of time-spaced light pulses,
a different intensity of the plurality of time-spaced light pulses,
a different polarization state of the plurality of time-spaced light pulses, or
different spectral characteristics of the plurality of time-spaced light pulses.

20. The sample inspection system of claim 11, wherein the collection subsystem is configurable into a plurality of configurations, wherein each of the plurality of configurations is characterized by at least one of:

a different size of a region of the sample from which the portion of light is collected, a different set of spatial directions from which the portion of light is collected, or a different polarization state of the collected portion of light.

21. A method to perform an inspection of a sample, the method comprising:

generating, using a pulsed light source, a source light pulse;

converting the source light pulse into a plurality of time-spaced light pulses using a plurality of optical loops, wherein each optical loop of the plurality of optical loops uses a respective optical coupler of a plurality of optical couplers to direct a first portion of light interacting with the respective optical coupler on an optical path to the sample and providing a second portion of the light interacting with the optical coupler as an input into a next optical loop of the plurality of optical loops;

illuminating the sample using the plurality of time-spaced light pulses;

collecting a portion of light generated upon interaction of the plurality of time-spaced light pulses with the sample;

directing the collected portion of light to a light detection sensor to generate a plurality of signals; and determining, using the plurality of signals, one or more characteristics of the sample.

22. The method of claim 21, further comprising:

repositioning, using a movable stage, the sample relative to the plurality of time-spaced light pulses, wherein repositioning the sample comprises imparting to the sample a combination of a translational motion and a rotational motion.

* * * * *